March 10, 1931.  R. F. TERNES  1,796,169

APPARATUS FOR MANUFACTURING TIRES

Filed Feb. 26, 1929

INVENTOR.
Raymond F. Ternes
BY Ernest Hopkinson
ATTORNEY

Patented Mar. 10, 1931

1,796,169

UNITED STATES PATENT OFFICE

RAYMOND F. TERNES, OF DETROIT, MICHIGAN, ASSIGNOR TO MORGAN & WRIGHT, OF DETROIT, MICHIGAN, A CORPORATION OF MICHIGAN

APPARATUS FOR MANUFACTURING TIRES

Application filed February 26, 1929. Serial No. 342,835.

This invention relates to devices for shaping pulley bands into tire casings.

In the art of building automobile tire casings it is customary to build the constituent parts of the tire casing around a flat drum so as to form an endless band known in the art as a pulley band. The pulley band is then shaped into the form of a tire casing by a suitable device such as a vacuum box which usually consists of an annularly shaped box provided with apertures to accommodate a pulley band and being hollow within so that by the application of reduced pressure within the vacuum box the pulley band may be forced by the action of atmospheric pressure into the shape of a tire casing. The apertures which permit the insertion of the pulley band within the vacuum box are necessarily of a larger diameter than the outside diameter of the pulley band so as to permit the pulley band to be readily inserted. It is necessary to provide a suitable means to effect an air-tight or substantially air-tight seal between the vacuum box and the pulley band so that upon withdrawing fluid from the interior of the vacuum box a reduced pressure will be formed which results in the shaping of the pulley band into the tire casing.

It is the object of this invention to provide a new and improved device for effecting the preliminay seal between the pulley band and the vacuum box. It is also the object of this invention to provide a device for effecting a preliminary seal between the pulley band and vacuum box which consists of an inflatable member disposed along the margins of the apertures which accommodate the pulley band. Other objects and advantages of the present invention will appear from the following detailed description taken in connection with the drawings, in which.

Figure 1:
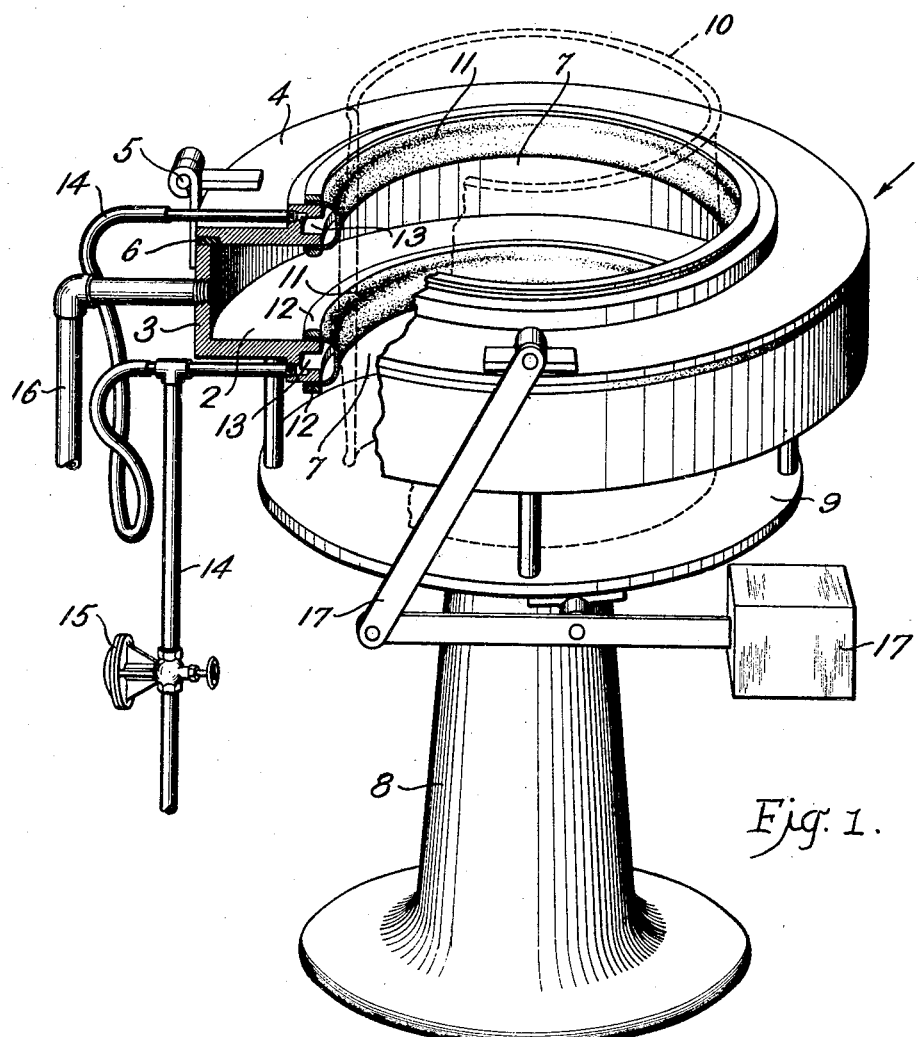
Fig. 1 is a perspective view partly broken away and in section of a preferred form of my invention.

The vacuum box 1 consists of a base plate 2 and integral side wall 3 together with the top plate 4 hingedly mounted as at 5 so as to open and close the casing. A suitable gasket 6 is provided to make an air-tight seal between the said wall 3 and top plate 4. The bottom plate 2 and top plate 4 are provided with apertures 7 of such a size as to readily permit the insertion of a pulley band therethrough. A suitable pedestal 8 is provided for supporting the vacuum box and has a platform 9 upon which a pulley band may rest when first inserted within the vacuum box, the vacuum box and platform 9 being spaced apart a sufficient distance so as to properly center the pulley band with respect to the vacuum box.

In order to effect a preliminary seal between a pulley band such as shown in dotted lines at 10 and the margins defining the apertures 7 of the vacuum box, an inflatable member 11 is arranged along the margin defining each of the apertures. This inflatable member is clamped or held in position on such margins by the clamping rings 12 which are held down by screws not shown or any other suitable means. It is preferred to provide circumferentially extending slots 13 in the margins defining the apertures, although such slots are not essential to the operation of the device. The slots 13 and the expansible members 11 form a substantially air-tight chamber which upon admission of fluid pressure expands so as to bring the inflatable member 11 into contact with the pulley band thereby forming a substantially air-tight seal between the vacuum box and the pulley band. Suitable pipe connections 14 having a reducing valve 15 and with a controlling hand valve (not shown) are provided to establish a connection between a suitable source of fluid pressure and the expansible chamber defined by the expansible member 11 and the circumferentially extending slots 13.

Suitable pipe connections 16 connect the interior of the vacuum box with a suitable means for evacuating the same and a suitable weighted lever system 17 is provided for opening and closing the top plate 4 of the vacuum box to permit the removal of the shaped tire casing at the end of the operation of the machine.

Figure 2:
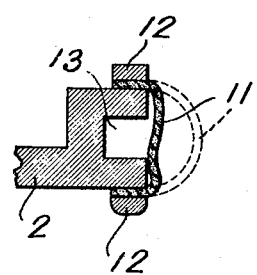
Fig. 2 is a detailed view in section showing the construction of my improvement.

In the operation of the hereinabove described apparatus, the hand valve controlling the pipe connections 14 and 15 is open so as to permit the pressure within the expansible chamber defined by the member 11 and slot 13 to fall to atmospheric pressure at which time the expansible member 11 assumes the deflated position shown in Fig. 2. A pulley band is positioned within the closed vacuum box as shown in dotted lines at 10. The hand valve controlling the pipe system 14 and 15 is then operated so as to introduce fluid pressure within the expansible chambers defined by members 11 and slots 13 which causes the expansible member 11 to assume the position shown in dotted lines in Fig. 2 and thereby to come into contact with the exterior of the pulley band to form a substantially air-tight seal therewith. The reducing valve 15 limits the maximum pressure acting upon the expansible member 11, and may be adjusted to provide the proper pressure. The next operation is to exhaust the interior of the vacuum box through the pipe connection 16 so that the atmospheric pressure may operate to force the pulley band within the vacuum box and thereby shape it into a tire casing. The operation is completed by the insertion of a curing bag within the formed tire casing and the application of a bull ring to the beads of a tire casing whereupon the casing and enclosed curing bag may be removed from the vacuum box by opening the top plate 4 thereof.

The expansible member 11 hereinabove described is preferably of a suitable rubber compound so that upon the reduction of pressure acting thereon it will assume the position shown in full lines in Fig. 2, although such an inflatable member 11 may be made of a non-stretchable material such as a rubberized fabric or other substantially air-impermeable material. The slot 13 aids in the deflation of the member 11 although such a slot is not essential to the operation of the device and a modified form may be made in which such a slot is absent.

While one form of the invention has been specifically described, various modifications in the kind of materials and arrangement of the members may be made as will be apparent to one skilled in the art, and all such modified forms of this invention are contemplated and are intended to be included within the scope of the following claims.

Having thus described my invention what I claim and desire to protect by Letters Patent is:

1. A sealing device for effecting a seal between a pulley band and a vacuum box having apertures to receive a pulley band which consists of an inflatable member disposed around the margin defining each aperture, and means for inflating and deflating the member.

2. The combination of a vacuum box having apertures to accommodate a pulley band, an inflatable means arranged along the margins defining the apertures, and means for controlling the degree of inflation of the inflatable means whereby the inflatable means may be expanded or contracted so as to permit the insertion of a pulley band therein and to form a seal therewith.

3. A vacuum box provided with apertures adapted to receive a pulley band, an expansible band of material fixed over each of the margins defining said apertures so as to form a substantially air tight chamber, and means for supplying fluid pressure within the bands whereby the expansible bands may be brought into contact with a pulley band in the vacuum box and effect a seal therewith.

4. A vacuum box provided with apertures adapted to receive a pulley band, there being a circumferentially extending groove in each of the margins bounding the apertures, an expansible band of material fixed over each of said slots so as to form a substantially airtight expansible chamber, and means for supplying fluid pressure to said chamber whereby it may be expanded so as to contact with a pulley band within the vacuum box and form a seal therewith.

Signed at Detroit, county of Wayne, State of Michigan, this 21st day of February, 1929.

RAYMOND F. TERNES.